US012201900B2

United States Patent
Rull et al.

(10) Patent No.: US 12,201,900 B2
(45) Date of Patent: *Jan. 21, 2025

(54) FACILITATING USERS TO COMPLETE ACTIVE GAME ACTIONS

(71) Applicant: Kabam, Inc., San Francisco, CA (US)

(72) Inventors: Henry Rull, Concord, CA (US); Luc Pieron, San Francisco, CA (US); Kevin Simmons, Oakland, CA (US); Jay Jodway, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/303,335

(22) Filed: Apr. 19, 2023

(65) Prior Publication Data

US 2023/0249065 A1 Aug. 10, 2023

Related U.S. Application Data

(63) Continuation of application No. 17/102,259, filed on Nov. 23, 2020, now Pat. No. 11,648,468, which is a
(Continued)

(51) Int. Cl.
*A63F 13/00* (2014.01)
*A63F 13/35* (2014.01)
(Continued)

(52) U.S. Cl.
CPC .............. *A63F 13/35* (2014.09); *A63F 13/45* (2014.09); *A63F 13/69* (2014.09); *A63F 13/79* (2014.09); *A63F 13/822* (2014.09)

(58) Field of Classification Search
CPC ..................................................... A63F 13/35
See application file for complete search history.

(56) References Cited

U.S. PATENT DOCUMENTS 10,874,940 B2 12/2020 Rull
2006/0111175 A1 5/2006 Walker
(Continued)

FOREIGN PATENT DOCUMENTS

WO 2002041208 1/2002

OTHER PUBLICATIONS

"Diamond—Hay Day", printed from URL http://hayday.wikia.com/wiki/Diamond, printed on Sep. 10, 2013, 1 page.
(Continued)

*Primary Examiner* — David L Lewis
*Assistant Examiner* — Eric M Thomas
(74) *Attorney, Agent, or Firm* — Esplin & Associates, PC

(57) ABSTRACT

A system and method for providing offers to facilitate users to complete active game actions in a game space are disclosed. Offers to forego a group of pending wait periods of active game actions may be generated and presented to the users at the same time or near the same time along with offers to forego these pending wait periods individually and separately. In some examples, for incentivizing the users to accept the offer to forego the group of pending wait periods, a discount may be determined for these offers with respect to the offers to forego the group of pending wait periods individually and separately. In some examples, selection of the group of pending wait periods may be made based on likelihoods as to whether the users will spend stored consideration to forego the group of pending wait periods individually and separately.

19 Claims, 5 Drawing Sheets

Related U.S. Application Data continuation of application No. 16/245,106, filed on Jan. 10, 2019, now Pat. No. 10,874,940, which is a continuation of application No. 15/842,224, filed on Dec. 14, 2017, now Pat. No. 10,188,944, which is a continuation of application No. 14/051,387, filed on Oct. 10, 2013, now Pat. No. 9,908,039.

(51) Int. Cl.
*A63F 13/45* (2014.01)
*A63F 13/69* (2014.01)
*A63F 13/79* (2014.01)
*A63F 13/822* (2014.01)

(56) References Cited

U.S. PATENT DOCUMENTS

| | | | |
|---|---|---|---|
| 2008/0097827 A1* | 4/2008 | Leach | G06Q 30/0201 |
| | | | 705/7.29 |
| 2009/0070081 A1* | 3/2009 | Saenz | G07F 17/3227 |
| | | | 703/2 |
| 2012/0221430 A1 | 8/2012 | Naghmouchi | |
| 2012/0245988 A1 | 9/2012 | Pace | |
| 2019/0143208 A1 | 5/2019 | Rull | |
| 2021/0069586 A1 | 3/2021 | Rull | |

OTHER PUBLICATIONS www.supercell.com, 8 pages.

* cited by examiner

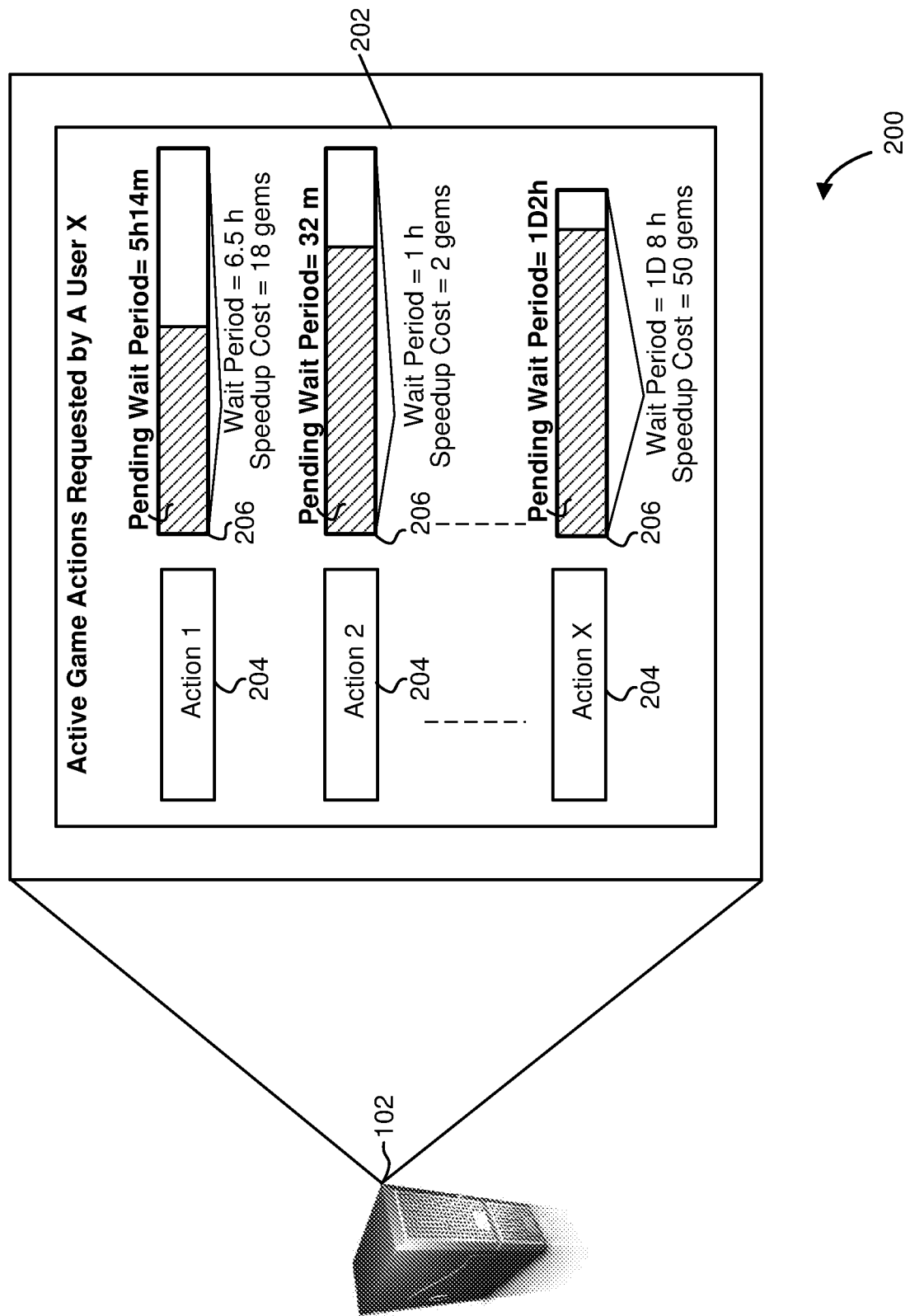
FIG. 2   Time: T

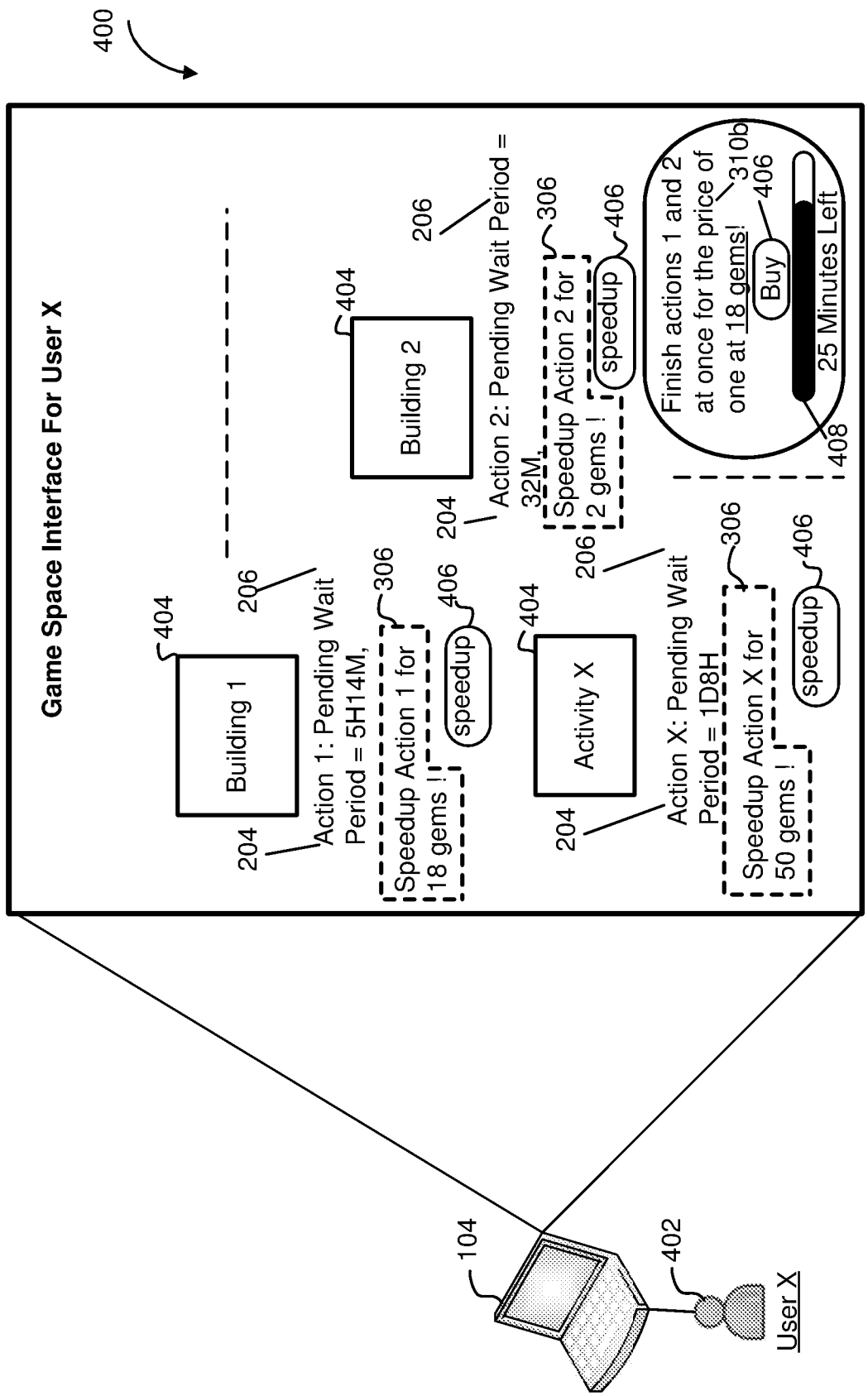
FIG. 4   Time: T

FACILITATING USERS TO COMPLETE ACTIVE GAME ACTIONS

FIELD OF THE DISCLOSURE

This disclosure relates to executing game actions in a game space on behalf of users.

BACKGROUND

Game systems that execute multiple game actions on behalf of players in game spaces hosted by those systems are known. In those systems, the players are typically enabled to initiate requests to perform game actions in the game spaces through game interfaces implemented on client computers. Such requests are then transmitted to those systems for execution in the game spaces. Execution of some game actions, such as maneuvering game characters, may be executed instantly by those systems. Execution of some other game actions, such as crafting virtual item and training troops may require extended time before completion. For example, a crafting action initiated by a user typically takes hours or even days to complete in those systems depending on the types of items being crafted (crafting rare virtual item typically takes longer for completion in those systems).

In those systems, speedup option may be available for a user to speed up a given game action being currently executed in the game space. Such a speedup option typically costs virtual currencies. By using the speedup option, the user may request those systems to complete the execution of the given game action in the game spaces instantly so that the user does not have to wait for the completion.

SUMMARY

One aspect of the disclosure relates to incentivizing and facilitating a user to forego pending wait periods of game actions being currently executed in a game space (hereinafter referred to as "active game actions"). An offer to forego a group of pending wait periods of active game actions all at once for an amount of stored consideration may be presented to the user at the same time along with offers to forego these pending wait periods individually and separately. In some examples, to incentivize the user to accept the offer to forego the group of pending wait periods all at once, the amount of stored consideration for the offer may include a discount with respect to amounts of stored consideration for the user to forego them individually and separately. In some examples, the group of pending wait periods may be selected for inclusion in the offer to forego them all at once based on factors such as likelihoods as to whether the user will spend consideration to forego them individually, and/or any other factors. This may enhance monetization opportunities for the provider(s) of the game space as the user may be incentivized to forego pending wait periods of active game actions they may not spend stored consideration to forego individually.

A system configured for incentivizing and facilitating a user to forego pending wait periods of active game actions may include a server. The server may operate in a client/server architecture with one or more client computing platforms. The client computing platforms may be associated with the users of the game space. The server may be configured to execute one or more of a game module, a user module, a prediction module, an offer module, a store module, an interface module, and/or other modules.

The game module may be configured to execute an instance of the game space in which an online game takes place. The users may interact with game space elements and/or with each other through gameplays provided by the online game. The gameplays may include role-playing, first-person shooter, real-time strategy, turn-based strategy, simulation, music and/or rhythm playing, social interaction, twitching and/or any other gameplays. The users may participate in the instance of the game space by inputting commands to initiate user actions for controlling one or more of game space elements. Upon receiving the user commands initiating the user actions, the game module may be configured to execute the user actions. Within the instance of the game space, virtual currencies may be provided to facilitate store and/or exchange of game space values.

The game module may be configured to execute game actions initiated by users to facilitate interaction of the users with the game space and/or each other in response to receiving game space commands input by the users. Some game actions initiated by users may require extended periods of time for game module to execute until completion. Typically, game actions such as crafting virtual items, constructing virtual buildings, training troops, mining for resources, farming for food supplies, manufacturing industrial outputs, and/or any other game actions reflecting corresponding processes in the game space may require extended periods of time for completion. Within the instance of game space executed by the game module, individual speedup options for user to forego pending wait periods of active game actions individually and separately may be available to users. Exercising the individual speedup options typically will cost user stored consideration such as gems, virtual resources, virtual items and/or any other stored consideration. The determination of such a cost may depend on a number of factors, for example such as pending wait time of the individual active game actions, the type of outputs or inputs associated with the individual active game actions, and/or any other factors.

User module may be configured to access and/or manage one or more user profiles and/or user information associated with individual users. The user information associated with an individual user may include information reflecting a balance of stored consideration associated with the individual user. The user information associated with an individual user may include information reflecting a balance of stored consideration associated with the individual user. The stored consideration associated with individual user may include, for example virtual currencies, real-world money, virtual objects, virtual resources, real-world objects (e.g., coupons) and/or any other types of stored consideration. The user information regarding the given user may include historic transaction information indicating previous spending by the user for foregoing the individual wait periods of active game actions.

Prediction module may be configured to predict likelihoods whether a user will spend consideration for foregoing pending wait periods of individual active game actions. In some exemplary implementations, the prediction module may perform statistics modeling and analysis on the historic user transaction information included in the user information managed by the user module to predict whether a user is likely or not likely to spend individual stored consideration for foregoing pending wait periods individually. Examples of the statistics analysis and modeling employed by the prediction module may include, without limitation, predictive models, regression analysis, time series modules, machine learning techniques and/or any other statistics analysis and modeling.

The offer module may be configured to generate offers to forego pending wait periods of game actions requested by the users in exchange for stored consideration from the users. The offers generated by the offer module may include offers enabling a user to forego pending wait periods of individual active game actions, offers enabling the user to forego pending wait periods of a group of active game actions all at once, and/or any other offers. In some examples, the offer module may determine an amount of stored consideration for the offers enabling the user to forego pending wait periods of a group of active games all at once. In some implementations, the offer module may be configured to determine the amount of stored consideration for such an offer based on the individual pending wait periods of the active game actions in the group. For example, the offer module may determine a discount off individual amounts of stored consideration for foregoing the individual pending wait periods based on factors such as the number of active game actions in the group, a total of individual cost for the user to forego pending periods of the active game actions in the group individually and separately, a sum of the amounts of the pending waiting periods of active game actives in the group and/or any other factors.

In some implementations, the offer module may be configured to select pending wait periods of active game actions for inclusion in the offer to forego them all at once from a set of pending wait periods that includes at least one pending wait period of an active game action that is not selected. In some examples, such selection by the offer module may be based on the likelihoods whether the user will spend considerations to forego the pending wait periods individually. In those examples, based on such likelihoods, the offer module may determine the amount of stored consideration for the offer enabling the user to forego selected pending wait periods.

Store module may be configured to enable users to spend stored consideration in exchange for virtual items and/or services usable in the game space. This may involve presenting offers of virtual items and/or services through an interface representing a virtual store in the game space. In some implementations, the store module may be configured to present offers to forego pending wait periods of active game actions generated by the offer module for user to purchase in the virtual store.

The interface module may be configured to facilitate presentation of game space interfaces implemented on client computing platforms associated the users. The interfaces generated by the interface module may present game space views implemented by the game module. In some exemplary implementations, the interfaces generated by interface module may include presentation of offers to forego pending wait periods of active game actions generated by the offer module. In those implementations, these offers may be presented in the game space interfaces facilitated by the interface module simultaneously or near simultaneously.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates one example of active game actions associated with a given user in the game space hosted by the system shown in FIG. 1.

FIG. 4 illustrates one example of a game space interface that presents the offers shown in FIGS. 3A-B at the same time using a system shown in FIG. 1.

DETAILED DESCRIPTION

Figure 1:
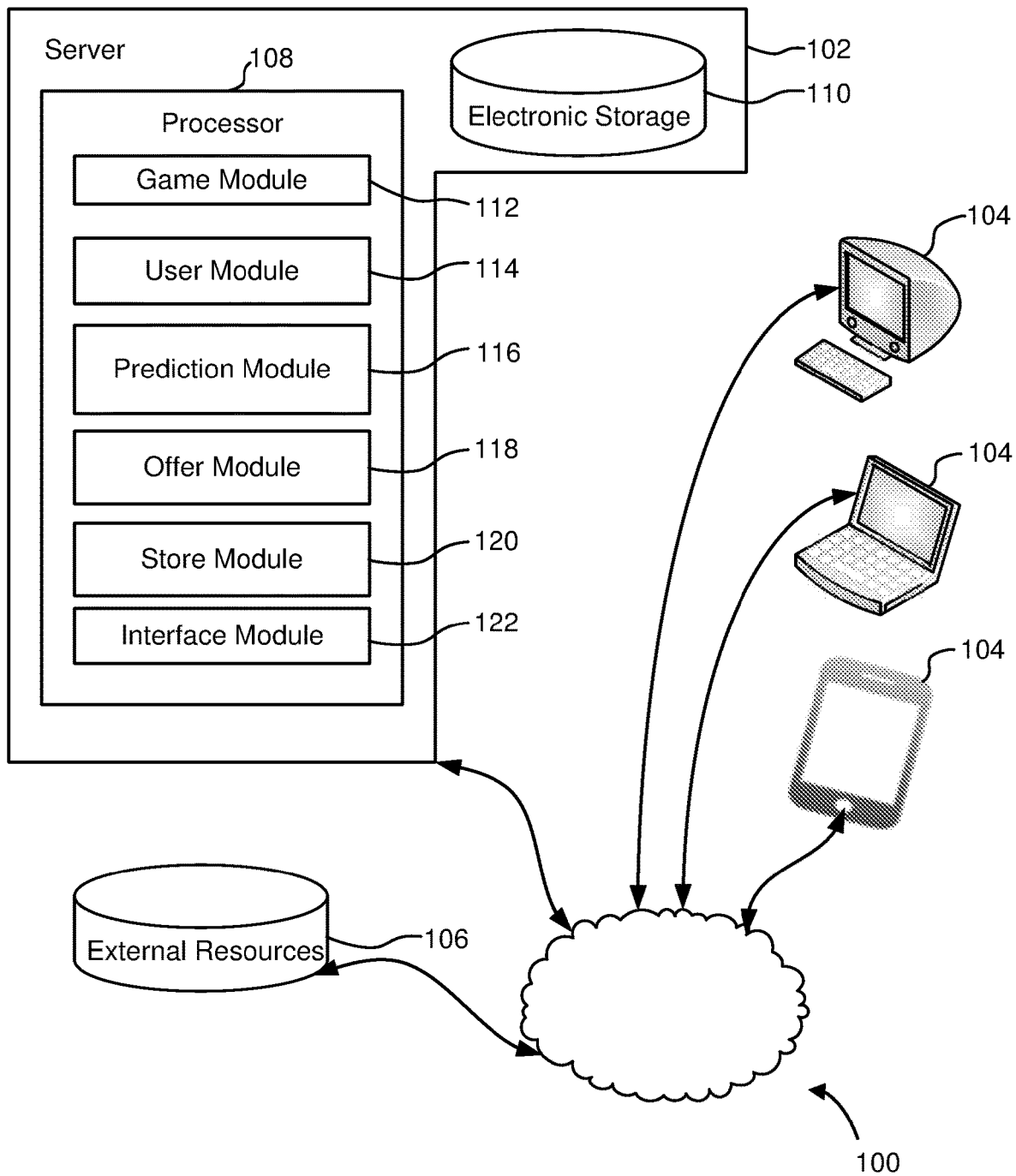
FIG. 1 illustrates a system 100 for providing offers enabling users to completing active game actions in an online game.

FIG. 1 illustrates a system 100 for providing offers enabling users to completing active game actions in an online game. Providing the game space/environment may include hosting the game space/environment over a network. Providing the game space may include hosting the game space over a network. The users may access system 100 and/or the game space via client computing platforms 104.

In some implementations, system 100 may include a server 102. The server 102 may be configured to communicate with one or more client computing platforms 104 according to a client/server architecture. The users may access system 100 and/or the game space via client computing platforms 104. The computer program modules may include one or more of a game module 112, a user module 114, a prediction module 116, an offer module 118, a store module 120, an interface module 122, and/or other modules.

The game module 112 may be configured to execute an instance of the game space in which an online game takes place. Within the instance of the game space, users may participate in the game space to experience gameplays provided by the online game. The gameplays may include role-playing, first-person shooter, real-time strategy, turn-based strategy, puzzle solving, chance-based playing, simulation, music or rhythm playing, social interaction, twitching and/or any other gameplays. For facilitating the user participation in the game space, the game module 112 may be configured to determine states of the game space communicated (e.g., via streaming visual data, via object/position data, and/or other state information) from server 102 to client computing platforms 104 for presentation to users. A given game space state determined and transmitted to a given client computing platform 104 may correspond to a view for a user character being controlled by a user via the given client computing platform 104 at a point of time in the game space. The given state determined and transmitted to a given client computing platform 104 may correspond to a location in the game space. The view described by the given state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the game space and/or the game that takes place therein may be persistent. That is, the game space and/or the game may continue on whether or not individual users are currently logged in and/or participating in the game. A user that logs out of the game space and then logs back in some time later may find the game space has been changed through the interactions of other users with the game space during the time the user was logged out. These changes may include changes to the simulated physical space, changes in the user's inventory, changes in other users' inventories, changes experienced by non-user characters, and/or other changes.

The instance of the game space may comprise a simulated space that is accessible by users via clients (e.g., client computing platforms 104) that present the views of the game space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The instance of the game space may comprise automatically controlled entities not associated with any user. As such, the automatically controlled game space entities may be generated, controlled, evolved, customized, developed and/or otherwise provided by artificial intelligence configured into the server 102 by a provider, administrator, moderator, and/or any other entities related to the game space. The automatically controlled game space entities interact with entities controlled by or associated with the users, other automatically controlled game space entities and as well as the topography of the game space. Certain traits, attributes and/or characteristics may be manifested by, possessed by and/or otherwise associated with the automatically controlled entities and evolved in the game space in accordance with the artificial intelligence. As an illustration, such evolving characteristics of the automatically controlled game space entities may include skills, abilities, powers, strength, stamina, physical appearances such as age, attire, facial expression, speech style and pattern, response style in reaction to user's interaction, gesture and/or any other traits. Examples of the automatically controlled game space entities may include game space characters, objects, components of the topography, game space phenomena (e.g., rains, storms, snow), and/or any other automatically controlled game space elements. As used herein, such automatically controlled game space entities in the instance of the game space are referred to as "AI entities".

The above description of the manner in which state of the game space is determined by game module 112 is not intended to be limiting. The game module 112 may be configured to express the game space in a more limited, or richer, manner. For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

Within the instance(s) of the game space executed by game module 112, the users may participate in the instance of the game space by controlling one or more of an element in the game space. The user controlled elements may include user controlled entities such as avatars, characters, units (e.g., troops) and/or any other user controlled entities, controlled objects such as weaponry, vehicle, artillery, medicine, decorative items and/or any other user controlled game space objects, simulated physical phenomena such as wind, rain, earthquakes, and/or other phenomena, and/or other user controlled elements. The user controlled avatars may represent the users in the game space. The user controlled characters (herein referred to as "user characters") may include heroes, knights, commanders, leaders, generals and/or any other individualized characters that may be trained, recruited, captured, and/or otherwise acquired by the users. The game space units controlled by the user may include troops, cohorts, and/or any other game space entities that may be trained, recruited, captured, and/or otherwise acquired by the users in groups or en mass. Unlike user characters, individual members of a game space unit controlled by a given user may not be individualized (e.g., they may share attributes associated with the unit of the troop).

In any case, the user controlled elements may move through and interact with the game space (e.g., AI entities, elements controlled by other users and/or topography in the game space). The elements controlled by a given user may be created and/or customized by the given user. The given user may have an "inventory" of virtual items (e.g., virtual goods and/or currency) that the given user can use (e.g., by manipulation of a user character or other user controlled elements, and/or other items) within the game space.

Controls of virtual elements may be exercised through commands input by the users through client computing platforms 104. The users may interact with each other through communications exchanged within the game space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through game module 112).

A given user may input commands with specific parameters through a client computing platform 104 associated with the given user to initiate user actions or sphere of actions, to under specific deeds, to perform functions and/or initiate any other types of interactions within the game space or with other users. For example, the given user may input commands to construct, upgrade and/or demolish virtual buildings, harvest and/or gather virtual resources, heal virtual user controlled elements, AI entities and/or elements controlled by other users, train, march, transport, reinforce, reassign, recruit, and/or arrange troops, attack, manage, create, demolish and/or defend cities, realms, kingdoms, and/or any other game space locations controlled by or associated with the users, craft or transport virtual items, interact with, compete against or along with AI entities and/or game space elements controlled by other users in combats, research technologies and/or skills, mine and/or prospect for virtual resources, complete missions, quests, and/or campaigns, exercise magic power and/or cast spells, and/or perform any other specific deeds, actions, functions, or sphere of actions within the game space. In some examples, the given user may input commands to compete against elements in an environment within the game space—i.e., PvE activities. In some examples, the given user may input commands to compete against each other within the game space—i.e., PvP activities.

The game module 112 may be configured to execute game actions initiated by users to facilitate interaction of the users with the game space and/or each other in response to receiving game space commands input by the users. Execution of the game actions by the game module 112 may produce changes to the game space state, which may reflect progresses and/or results of the game actions. In some examples, state changes caused by the execution of the game actions initiated by users may be recorded in the electronic storage 110 to facilitate persistency throughout the instance of the game space. In some examples, execution of the game actions may not produce persistent changes to the game space state (e.g., a user character jumping forward and backward successively may not produce any perceivable game state changes to other users).

Execution of some game actions initiated by users may require wait periods until completion. Such wait periods may be determined by the provider, administrator, moderator, and/or any other entities related to the game space to reflect processes associated with execution of these actions in the game space. Typically, game actions such as crafting virtual items, constructing virtual buildings, training troops, mining for resources, farming for food supplies, manufacturing industrial outputs, and/or any other game actions reflecting corresponding processes in the game space may require extended periods of time for completion as determined by the provider(s) of the game space. For example, a game action of constructing a virtual building in the game space may be determined by the provider of the game space to take 3 hours to complete by the game module 112 on behalf of the user. In that example, the virtual building will be available for the user to use in the game space 3 hours from the time when the user first initiated the building construction action in the game space.

As described herein, a wait period of a game action is referred to as an amount of time required for the execution of the game action to be completed in the game space by the game module 112 starting from the time when game module 112 first receives a request from a user to execute the game action. As described herein, a pending wait period of an active game action is referred to as the amount of time left for in the execution of the active game action by game module 112. Typically, a pending wait period of a game action that is active is a portion of the wait period of that game action.

Within the instance of game space executed by the game module, individual speedup options for user to forego pending wait periods of active game actions individually and separately may be available to users. Exercising the individual speedup options typically will cost a user stored consideration such as gems, virtual resources, virtual items and/or any other stored consideration as however desired by the provider, administrator, moderator, and/or any other entities related to the game space. For example, for completing a barrack construction instantly, the provider may determine it will cost the user certain amount of gems. Within the instance of the game space, a given individual speedup option may be associated with a given active game action such that the cost for the given individual speedup option is calculated based on one or more attributes of the give active game action.

A cost of the given individual speedup option associated with the given active game action may be calculated at any given time in the game space for the user. A number of factors may contribute to such a calculation. For example, the calculation may depend on the amount of time in the pending wait period of the individual active game action at the given time. A cost-pending wait time table for such calculation may be determined by the provider, administrator, moderator, and/or any other entities related to the game space. By such a table, the provider, administrator, moderator, and/or any other entities related to the game space may specify, for an individual game action, corresponding costs for foregoing specific pending waiting periods associated with the individual game action when it is active. By way of a non-limiting example, an instance of such a table may specify that foregoing pending wait period of an active level 2 barrack construction action during its $2^{nd}$ hour to $3^{rd}$ hour execution period (say the wait period of the level 2 barrack construction active is a full 3 hour period) may cost a user 24 gems; foregoing pending wait period of the active level 2 barrack construction action during its 1st hour to 2nd hour execution period will cost the user 16 gems; foregoing pending wait period of the active level 2 barrack construction action during its 0th hour to 1st hour execution period will cost the user 8 gems; and so on. According to such a table, a cost for foregoing wait period of an active level 2 barrack construction action may be calculated dynamically at a given time by first obtaining an amount for the pending wait period starting from the given time; and then retrieving the cost corresponding to the obtained wait period from the table. As an illustration, say at a given time, the pending wait period of the level 2 barrack construction action by the user is 51 minutes, it may be determined that the cost to forego the 51 minute pending wait period for the user is 8 gems in accordance with the table described above; if the pending wait period is 1 hour 24 minute, it may be determined that the cost to forego the 1 hour 24 minute pending wait period is 16 gems in accordance with the table described above.

The amount of a pending wait period of an active game action at a given time (e.g., as measured by time) is not necessarily the only factor for calculating the cost for a user to forego the pending wait period of the game action at the given time. Other factors for such calculation may include the type of output by the active game action, a number of inputs required by the active game action, a promotion (e.g., a discount), a and/or any other factors. For example, such a cost may be calculated based on a type of output by the active game action. As an example, the costs for foregoing pending wait periods of active game actions for crafting rare virtual items, training high level troops, constructing high level virtual buildings and so on cost more are higher than those for less advanced game actions.

FIG. 2 illustrates one example of active game actions associated with a given user in the game space hosted by the system shown in FIG. 1. As shown, in this example, at a given time, time T in this example, a given user, user X in this example may be associated with active game actions 204, which are being currently executed in the game space by the server 102, for example via game module 112. As illustrated the information regarding active actions associated with a user may be displayed in an interface 200 that has an information window 202. In some examples, the interface 200 may be embedded in an administrative interface facilitating administrator, moderators, provides and/or any other administrative entities of the game space to regulate active game actions by users. In some examples, the interface 200 may be embedded in a game space interface implemented on client computing platform 104 associated with users for the users to manage their own active game actions.

In any case, as illustrated, information regarding execution of the individual active game actions 204 may be displayed in the information window 202. As illustrated, in this example, active game action 1 is associated with 6.5 hour wait period such that the execution of game action 1 takes 6.5 hours to complete from the time when the game module 112 first receives a request to execute action 1 from the user. As also illustrated, the individual active game actions are associated with pending wait periods 206 at time T. As illustrated, in this example, the active game action 1 has 5 hour 14 minute of pending wait period until completion at time T. As still illustrated, an individual cost for the user to forgo individual pending wait periods of the active game actions may be determined at time T and presented to the user in information window 202. For example, at time T, the cost for the user to forego pending wait period 206 associated with active action 1 is 18 gems, the cost to forego pending wait period 206 associated with active action 2 is 2 gems, and the cost to forego pending wait period 206 associated with active action 3 is 50 gems.

Within the instance of the game space, virtual currencies may be provided to store and/or exchange of game space values. Units of the virtual currencies (for example, a gold, a gem, a silver, a coin, a token, and so on) may reflect game space values as determined by a provider, administrator, moderator, user, and/or any other entities related to the game space. Through one or more units of virtual currencies, game space values may be captured, stored, and circulated in the game space. As one non-limiting example, combinations of user actions, skills, virtual items, time, and/or any other game space elements may be captured, stored and circulated through virtual currencies to reflect the game space values created by user labor in interacting with the game space. For instance, a user may be provided 1000 gems after prospecting and mining for the gems in the game space for a period of time with certain required mining equipment operable only by a skilled game space miner, which the user has expanded labor to become.

Within the instance of the game space, the virtual currencies may be collected, earned, purchased, gifted, or otherwise acquired by the users. For example, the users may purchase the virtual currencies with real-world money consideration (e.g., credit payment through credit card, electronic vouchers provided by the provider of the game space, physical tokens, and so on) through a virtual store. The users may earn the virtual currencies, for example through gameplays provided in the game space (e.g., PvP activities, PvE actives, in game tournament, task, quest, mission, and so on). By way of a non-limiting example, a given user may earn a predetermined amount of virtual currencies after completing an in-game task in the game space. In some examples, the provider of the game space may simply make certain amount of virtual currencies available, for instance through treasure troves in the game space such that the users may gratuitously collect the virtual currencies by exploring for the treasure troves. The users may acquire virtual currencies by receiving gifts that comprise virtual currencies from other users. One of ordinary skills in the art will appreciate that there are other ways to for the users to acquire virtual currencies in the game space.

Within the instance of game space, virtual currencies may be consumed by users to facilitate interactions with the game space. For example, the providers of the game space may require the users to spend virtual currency to fund actions and/or activities engaged in by the users. For instance, the provider may impose a 100 gem fee for a user to participate an event within the game space. In some examples, user may consume virtual currency for purchasing virtual items, for example through the virtual store operated by provider, administrator, moderator, and/or any other entities related to the game space.

Within the instance of the game space executed by game module 112, resources may be, for example, generated, cultivated, mined, harvested, purchased, earned, consumed, traded and/or gifted over time by units, characters, pets, buildings, facilities and/or any other infrastructure or entity in the game space for the user. Resources may be prospected. Resources may be virtual items of value that can be accumulated through participation in the game space, rather than virtual currencies that store values in the game space as described above. As such, resources may be used to satisfy resource requirements in the game space. By way of non-limiting examples, game space resources may include food (e.g., rice, fish, wheat, etc.), wood, minerals (e.g., good, iron, ore, coal, oil, stone, crystal, etc.), plants, animals, and/or any other resources appropriate for the game space. Transfer of resources between users may be reflected through user inventories such that the transferor user's inventory reduces an amount of the transferred resources that are added to the transferee user.

User module 114 may be configured to access and/or manage one or more user profiles and/or user information associated with individual users. The user information managed by the user module 114 may be stored in a network storage location such as the electronic storage 110 shown in this example, and/or any other storage locations. The user information associated with an individual user may include information reflecting a balance of stored consideration associated with the individual user. The stored consideration associated with individual user may include, for example virtual currencies, real-world money, virtual objects, virtual resources, real-world objects (e.g., coupons) and/or any other stored consideration. Balances of such store considerations associated with the individual user may be maintained, modified, account, retrieved, tracked, and/or otherwise managed by the user module 114. By way of a non-limiting example, for a given user, the user information may reflect that the give user has 50 gems, 40 dollars, 10 gam space coupons, and/or other stored consideration associated with the given user.

Figure 3A:
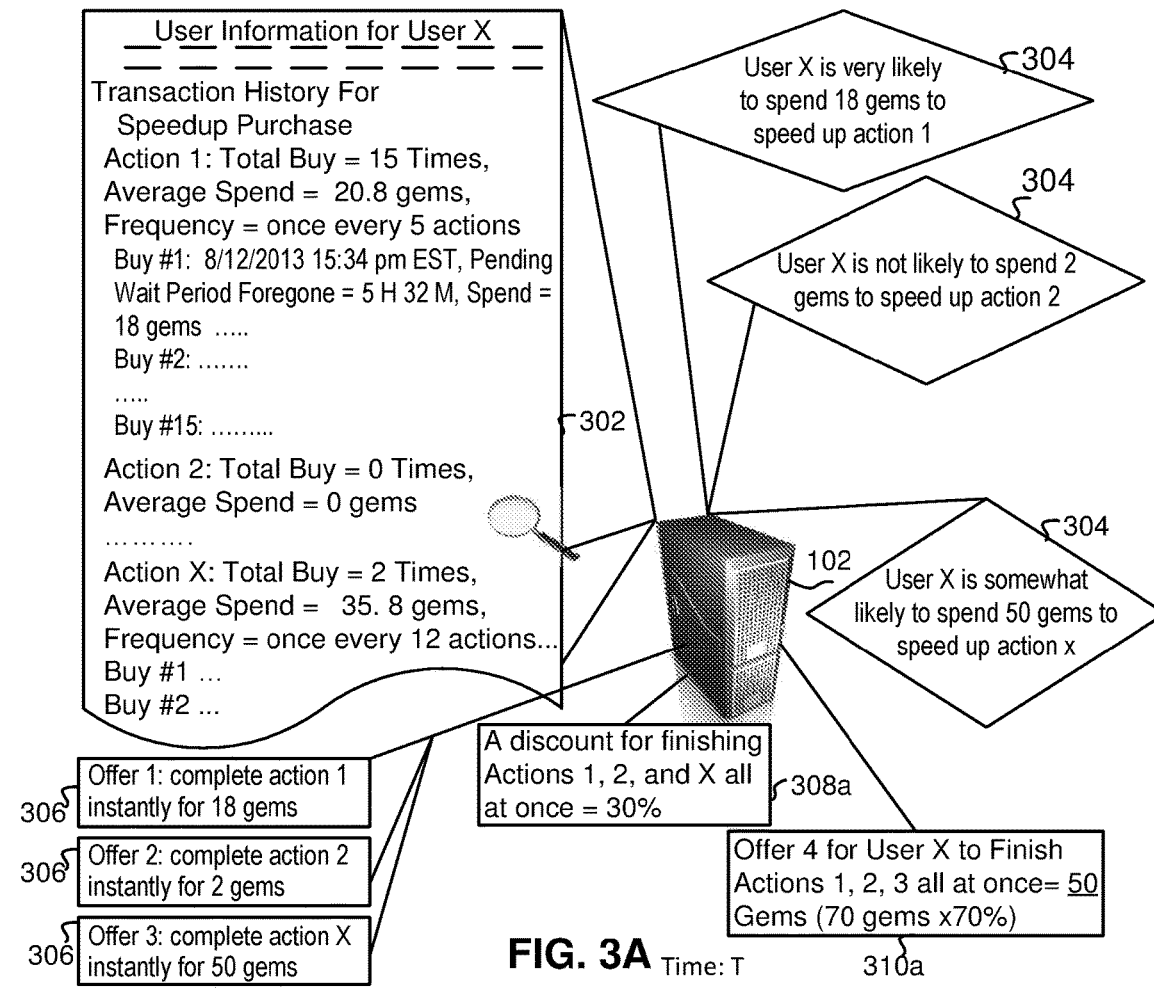
FIG. 3A illustrates one example of generating offers to forego pending wait periods of active game actions shown in FIG. 2.

The user information regarding the given user may include historic transaction information indicating previous spending by the user for foregoing the individual wait periods of active game actions. In some exemplary implementations, such historic transaction information may reflect various statistics and details about the individual spending by the user for foregoing the individual wait periods of active game actions. Example of such statistics may include number of times spending by the user for foregoing pending wait period of a particular active game action, frequency of such spending by the user with in a time period of interest (e.g., past 24 hours, past week, past month and so on), average amount of spending by the user for foregoing this particular active action in the time period of interest, and/or any other statistics. In some examples, details of individual spending by the user for foregoing pending wait period of the particular time may be included such historic transaction information, such as date and time when the individual spending occurred, the amount of pending wait period foregone by the user, an amount of stored consideration spent by the user for foregoing the pending wait period in that instance, and/or any other details. FIG. 3A illustrates an example of such historic transaction information in further details.

In various implementations, the server 102 may include a prediction module 116 configured to predict likelihoods whether a user will spend consideration for foregoing pending wait periods of individual active game actions. In some examples, the prediction module 116 may be configured to make such likelihood predictions based on the user information managed by the user module 114. For example, statistics analysis and models, such as predictive models, regression analysis, time series modules, machine learning techniques and/or any other statistics analysis and models may be configured into the prediction module 116. In that example, the prediction module 116 may be configured to employ such statistics model and analysis on the historic user transaction information described above to make prediction whether a user is likely or not likely to spend individual stored consideration for foregoing pending wait periods of individual active game actions, such as the pending wait periods 206 shown in FIG. 2.

FIG. 3A illustrates one example of predicting likelihoods whether a user is likely to spend store considerations for foregoing pending wait periods of active game actions shown in FIG. 2. As shown in this example, at the given time shown in FIG. 2, time T, the server 102 may, for example via the prediction module 116 make predictions 304 as to whether a user, i.e. user X in this example, will likely forego individual pending wait periods 206 shown in FIG. 2. As shown in this example, the server 102 may make the predictions 304 by examining historic transaction information indicating user X past spending for foregoing pending wait periods of individual active game actions, such as active game actions 204. As illustrated, such historic transaction information may be included in the user X information 302, for example managed by and obtainable from the user module 114.

As shown in this example, the historic transaction information may include various statistics and details regarding a user's past spending for foregoing pending wait periods of active game actions, such as active game actions 1, 2 and X. Based on such historic information about a user, the server 102 may, e.g., via the prediction module 116 determine likelihoods as to whether a user will spend stored consideration to forego pending wait period of active game actions. As illustrated in this example, based on the historic information about user X, the server 102 determines that the user X is likely to spend stored consideration (e.g., 8 gems) to forego the pending wait period of active game action #1 at time T, but is not likely to spend store consideration (e.g., the 2 gems) to forego the pending wait period of active game action #2 at time T. As also illustrated, the server X in this example also makes a prediction that user X is somewhat likely to spend stored consideration (e.g., 50 gems) to forego the pending wait period of the active game action #3 at time T.

The offer module 118 may be configured to generate offers to forego pending wait periods of game actions requested by the users in exchange for stored consideration from the users. The offers generated by the offer module 118 may include offers enabling a user to forego pending wait periods of individual active game actions, offers enabling the user to forego pending wait periods of a group of active game actions all at once, and/or any other offers. The offers generated by the offer module 118 may be presented to users, via a game space interface simultaneously or near-simultaneously. For example, FIG. 3A illustrates that the server 102 may, via the offer module 118 generate individual offers 306 for the user to forego pending wait periods of the active game actions, such as the pending wait periods 206 of active game actions 1, 2, and X shown in FIG. 2, individually and separately. As also shown in FIG. 3A, at time T, the server 102 may generate an offer 310 for the user to forego pending wait periods of game actions 1, 2, and X all at once at time T.

Some users may develop habits to engage in certain game plays more interactively than others. For example, a user may develop habits to engage in crafting gameplays more often than other gameplays such as troop training. In that example, the crafting actions by the user may present more monetization opportunities than troop training actions by the user as the user may be inclined to buy virtual equipment and virtual objects for engaging in craft actions than troop training actions, and to pay for speeding up craft actions than for troop training actions. However, some troop training actions provided by those systems may be required for the user to engage in certain crafting actions. As the execution of those active troop training actions run their normal courses of execution for extended periods of time since the user is not inclined to pay to speed them up, the user is prevented from engaging in the dependent crafting actions, which at least delay monetization opportunities for the provider(s) of the game space. The offer module 118 may generate offers to incentivize users to forego a group of waiting periods of active game actions including those that the user will likely not to pay to forego.

In some examples, for so incentivizing, the offer module 118 may determine an amount of stored consideration for an offer enabling the user to forego pending wait periods of a group of active games all at once; and the determined amount of stored consideration may be less than a sum of the individual stored consideration for foregoing pending wait periods of the individual ones in the group of the active game actions individually and separately. In some implementations, the offer module 118 may be configured to determine the amount of stored consideration for such an offer based on the individual pending wait periods of the active game actions in the group. For example, the offer module 118 may determine a discount off individual amounts of stored consideration for foregoing the individual pending wait periods based on factors such as the number of active game action in the group, a total of individual cost for the user to forego pending periods of the active game actions in the group individually and separately, a sum of the amounts of the pending waiting periods of active game actives in the group and/or any other factors. In some exemplary implementations, the determination of such a discount by the offer module 118 may correlate with one or more these factors. For example, the offer module 118 may determine a discount of 40% off at a first given time based on the number of the active game actions in the group at the first given time is 10; determines another discount of 30% off at a second given time based on the number of the active game actions in the group at the second given time is 6; determines a third discount of 20% off at a third given time based on the number of the active game actions in the group at the third given time is 4; and so on. In another example, the offer module 118 may determine a discount of 40% off at the first given time based on a sum of the pending wait periods of the game actions in the group at the first given time is 30 hours; determine another discount of 30% off at the second given time based on a sum of the pending wait periods of the game actions in the group at the second given time is 20 hours; determine a third discount of 20% off at the second given time based on a sum of the pending wait periods of the game actions in the group at the third given time is 10 hours; and so on. Other examples of determining such discounts based on other factors such as the sum of stored consideration for foregoing the pending wait periods of the individual ones of the active actions in the group are also contemplated.

For example, FIG. 3A illustrates an example of the server 102 determining a discount for the offer to forego pending wait periods of a group of active game actions based on the sum of stored consideration for foregoing pending wait periods of the individual ones of the active actions in the group. As shown, the server 102, e.g., via the offer module 118 may determine such a discount based on the individual stored consideration for offers 306. In this example, as shown, for determination of such a discount, the server 102 may first determine that the sum of the individual stored consideration for foregoing actions 1, 2, and X is 70 gems. Based on this sum, the server 102, e.g., via the offer module may determine a discount 308a to be applied to the offer to forego pending wait periods of active game actions 1, 2, and X all at once, e.g., the offer 310 as shown. In this example, the server 102 determines such a discount should be 30% to incentivize the user to accept the offer 310. Based on this discount, as shown, the server 102 determines that the stored consideration for offer 310 should be 50 gems.

In some implementations, the offer module 118 may be configured to select pending wait periods of active game actions for inclusion in the offer to forego them all at once from a set of pending wait periods that includes at least one pending wait period of an active game action that is not selected. In some examples, such selection by the offer module 118 may be based on the likelihoods whether the user will spend considerations to forego the pending wait periods individually. For example, in some instances, the offer module 118 may be configured with programming rules to select at lease some pending wait periods of the active game actions that the user is likely to pay to speed up and at least some pending wait periods of the active game actions that the user is somewhat likely to pay to speed up, as predicted by the prediction module 116. In this way, the user may be motivated to pay and speed up both types of active game actions. Accordingly, in those instances, the offer module 118 may be configured not to select the pending wait periods of those active game actions that the user is not likely to pay to speed up. However, this is merely illustrative. In some instances, the offer module 118 may make the selection to include all the pending wait periods that the user is likely to pay to speed up and some pending wait period that the user is somewhat likely to pay to speed up, but not those the user is likely not to pay to speed up. Other permutations of selecting pending wait periods of active game actions for inclusion in an offer to forego them all at once are also contemplated.

Figure 3B:
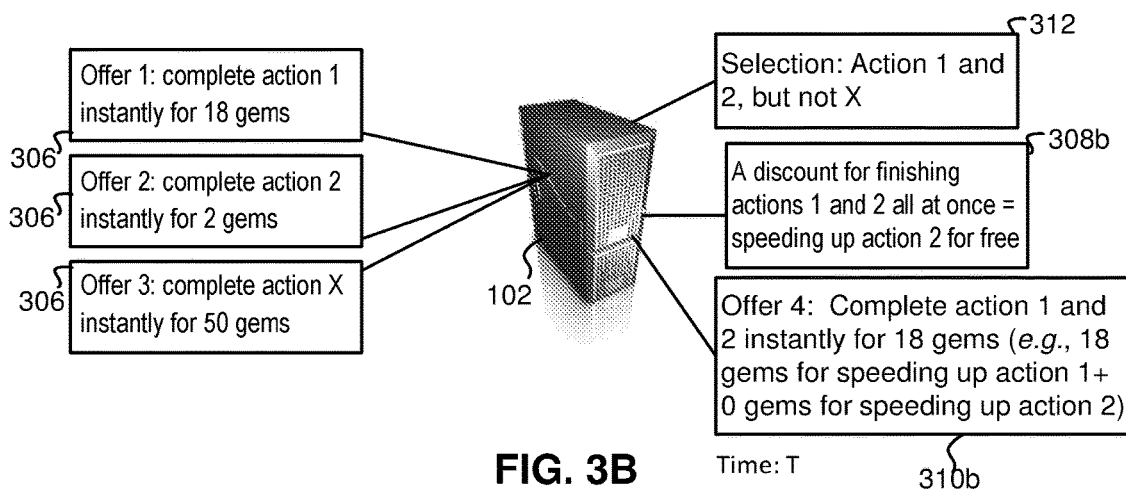
FIG. 3B illustrates another example generating offers to forego pending wait periods of active game actions shown in FIG. 2.

For example, FIG. 3B illustrates server 102 selecting pending wait periods of game actions the user is likely to pay to speed and pending wait periods of the game actions the user is not likely to pay to speed up for inclusion in an offer for a user to forego those pending wait periods all at once. As shown in this example, at time T, the server 102, e.g., via the offer module 118 may make a selection 312 based on the likelihoods 304 shown in FIG. 3A. In this example, the server 102 determines to select the pending wait period of game action 1 in the offer 4 since the user is likely to pay to forego the pending wait period of active game action #1; and the server 102 also determines that pending wait period of active game action #2 should be included in offer 4 since the user is not likely to pay to forego it; and the server 102 determines that the pending wait period of active game action #3 should not be included in offer 4 since the user is somewhat likely to pay to forego it. As shown, based on the selection 312, the server 102 may determine a discount 310b. In this example, the discount 310b determined by the server 102 is that the pending wait period of the game action 2 may be foregone for free. As shown, based on the discount 310b, the server 102 may determine the stored consideration for the offer to forego selected pending wait periods of active game actions, e.g., actions 1 and 2. In this example, the server 102 determines the stored consideration for offer 4 should be 18 gems, as illustrated.

Store module 120 may be configured to enable users to spend stored consideration in exchange for virtual items and/or services usable in the game space. This may involve presenting offers of virtual items and/or services through an interface representing a virtual store in the game space. Such an interface may be implemented on client computing platforms 104 and the users may be enabled to purchase virtual items included in the offers presented through the interface. In some implementations, the store module 120 may be configured to present offers to forego pending wait periods of active game actions generated by the offer module 118 for user to purchase. For example, the offers 306, 310a, 310b shown in FIGS. 3A-B may be presented to the user for user in a store interface implemented on a client computing platform 104 associated with the user.

The interface module 122 may be configured to facilitate presentation of game space interfaces implemented on client computing platforms associated the users. The interfaces generated by the interface module 122 may present game space views implemented by the game module 112. The interfaces generated by the interface module 122 may be presented on electronic displays coupled to and/or associated with the client computing platform 104. In some exemplary implementations, the interfaces generated by interface module 122 may include presentation of offers generated by the offer module 118, such as the offers 306, 310a, 310b shown in FIGS. 3A-B. In those implementations, these offers may be presented in the game space interfaces facilitated by the interface module 122 simultaneously, or near simultaneously.

FIG. 4 illustrates one example of a game space interface that presents the offers shown in FIGS. 3A-B at the same time using a system shown in FIG. 1. As shown, a game space interface 400 may be presented on a client computing platform 104 to a user 402, user X in this example, at time T. As shown, the game space interface 400 may present a view of the game space implemented by the system 100, for example via the game module 112. As illustrated in this example, at time T, the game space view for user X may comprise views of virtual buildings 402—e.g., buildings 1, 2, and X, and other virtual objects (not shown in this example for clarity of illustration). As shown in this example, active game actions, e.g., such as the active game actions 204 may be associated with virtual buildings 402 (e.g., active game actions 204 may be facilitated by the virtual buildings 204 in the game space). As illustrated, through the game interface 400, information such as pending wait periods of the active game actions 204 may be presented in the game space interface 400. As also illustrated, individual offers for the user 402 to forego pending wait periods of the active game actions 204 may be presented in the game space interface 400, such as the offers 306 shown and described in FIGS. 3A-B. For these individual offers 306, as shown, a control button 406 may be graphically presented to enable the user 402 to accept the individual offers 306.

As shown in this example, along with the presentation of the offers 306 in the game space interface 400, an offer, e.g., the offer 310b to forego pending wait period of a group of active game actions 204—active game actions 1 and 2 in this example. As illustrated and described in FIG. 3B, the active game actions 1 and 2 may be selected for inclusion in the offer 310b by the server 102, for example via the offer module 118. As also shown, a control button 406 may be presented graphically in the game space interface 400 to enable the user to accept the offer to forego pending wait period of the group of active game actions 204 all at once. As still shown, in some examples, such as in this example, a time bar 408 may be presented in the game space interface 400 to display within a limited period of time the offer to forego pending wait period of the group of active game actions 204 all at once is available to the user. That is, the user must accept such an offer within this limited period of time.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute modules 112, 114, 116, 118, 120, 122. Processor 108 may be configured to execute modules 112, 114, 116, 118, 120, 122 by software; hardware; firmware; some combination of software, hardware, and/or firmware; and/or other mechanisms for configuring processing capabilities on processor 108.

It should be appreciated that although modules 112, 114, 116, 118, 120, 122 are illustrated in FIG. 1 as being co-located within a single processing unit, in implementations in which processor 108 includes multiple processing units, one or more of modules 112, 114, 116, 118, 120, 122 may be located remotely from the other modules. The description of the functionality provided by the different modules 112, 114, 116, 118, 120, 122 described below is for illustrative purposes, and is not intended to be limiting, as any of modules 112, 114, 116, 118, 120, 122 may provide more or less functionality than is described. For example, one or more of modules 112, 114, 116, 118, 120, 122 may be eliminated, and some or all of its functionality may be provided by other ones of modules 112, 114, 116, 118, 120, 122. As another example, processor 108 may be configured to execute one or more additional modules that may perform some or all of the functionality attributed below to one of modules 112, 114, 116, 118, 120, 122.

Figure 5:
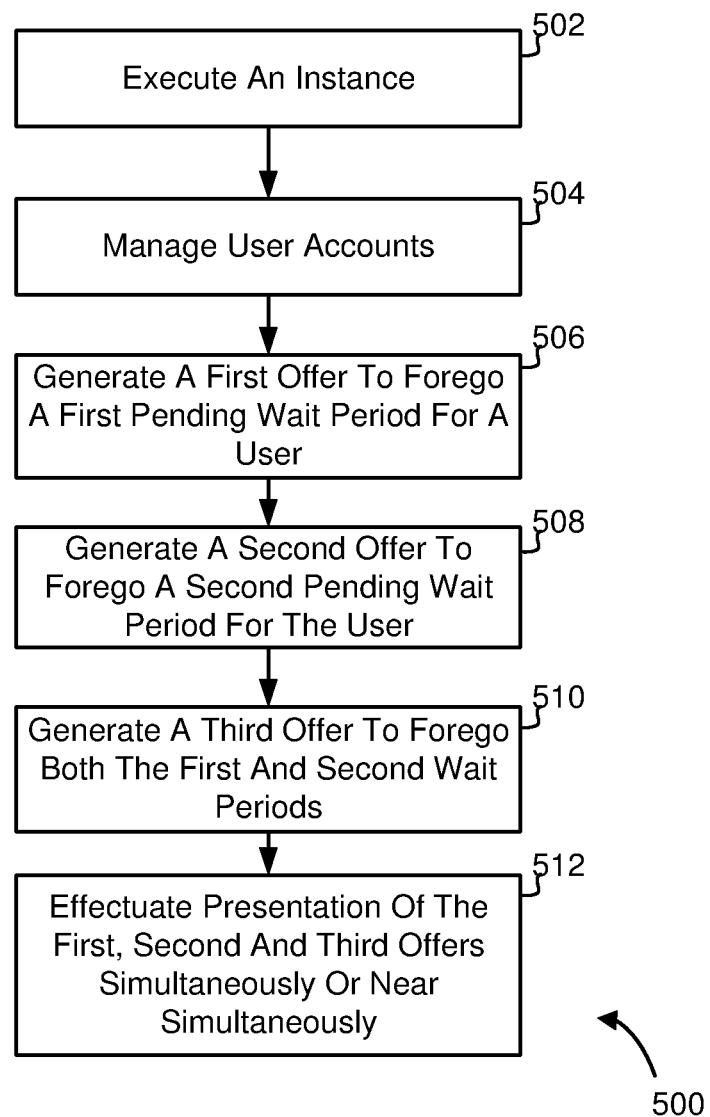
FIG. 5 illustrates one exemplary method 500 for providing offers enabling users to complete active game actions in an online game in accordance with the disclosure.

FIG. 5 illustrates one exemplary method 500 for providing offers enabling users to complete active game actions in an online game in accordance with the disclosure. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5A and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, an instance of a game space may be executed and implemented to determine view information for transmission to one or more client computing platforms associated with users. The users may interact with the game space by initiating game space commands to perform game actions. The game actions may be executed in the game space. Execution of some game actions initiated by users may require wait periods until completion. Within the instance of the game space implemented in operation 502, at a given time, a number of active game actions may be currently being executed in the game space. Such active game actions may be associated with pending wait periods until completion, which are typically a portion of corresponding wait periods. In some implementations, operation 502 may be performed by a game module the same as or similar to game module 112 (shown in FIG. 1 and described herein).

At an operation 504, user accounts associated with the users may be managed. The user accounts managed in operation 504 may comprise user information reflecting balances of stored consideration associated with users; historic transaction information reflecting the users' past spending to forego pending wait periods of active game actions, and other user information. In some implementations, operation 504 may be performed by a user module the same as or similar to user module 114 (shown in FIG. 1 and described herein).

At an operation 506, a first offer to forego a pending wait period of a first active game action at a given time may be generated. In some implementations, operation 506 may be performed by an offer module the same as or similar to offer module 118 (shown in FIG. 1 and described herein).

At an operation 508, a second offer to forego a pending wait period of a second factive game action at the given time may be generated. In some implementations, operation 508 may be performed by an offer module the same as or similar to offer module 118 (shown in FIG. 1 and described herein).

At an operation 510, a third offer to forego both the first and second waiting periods may be generated. For incentivizing a user to accept the third offer, an amount of stored consideration for the third offer may be determined based on the first offer generated in operation 506 and the offer generated in operation 508. In some examples, a discount may be determined in operation 510 for the third offer with respect to the first and second offers. In some examples, a selection of the pending wait periods of the first and second active game actions for inclusion in the third offer may be made in operation 510 such that at least one other pending wait period of action game action is not selected in operation 510 for inclusion in the third offer. In some examples, such selection may be made based on likelihoods of a user will spend stored consideration to forego the first and second pending wait periods individually. In some implementations, operation 510 may be performed by an offer module the same as or similar to offer module 118 (shown in FIG. 1 and described herein).

At an operation 512, presentation of the first, second and third offers generated in operations 506, 508, 510 respectively may be effectuated to a user simultaneously or near simultaneously. In some implementations, such presentation may be effectuated through a store interface implemented on a client computing platform associated with the user. In those implementations, operation 512 may be performed by store module the same as or similar to store module 120 (shown in FIG. 1 and described herein). In some implementations, such presentation may be effectuated through a game space interface to the user implemented on the client computing platform. In those implementations, operation 512 may be performed by a game space interface module the same as or similar to interface module 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating completion of game actions by users within an online game without having to wait for periods of time for the completion of the game actions, the system comprising:
one or more physical processors configured by machine-readable instructions to:
execute an instance of a game space in which the online game is played, and enable interaction of the users with the game space and/or each other, wherein playing the online game includes executing game actions on behalf of the users, wherein the game actions include game actions that require particular periods of time for corresponding completion, wherein the particular periods of time are removable and/or reducible such that the users no longer have to wait for the particular periods of time, wherein the game actions include a first game action that requires a first period for a first completion and a second game action that requires a second period for a second completion;
generate offers to remove or reduce the particular periods of the game actions in exchange for consideration from the users, wherein the offers generated for the first user include a particular offer to remove both of the first period and the second period in exchange for a particular amount of consideration; and
present the particular offer to the first user through one or more user interfaces on a first client computing platform, wherein the first client computing platform is associated with the first user.

2. The system of claim 1, wherein the offers further include a first offer to remove or reduce the first period in exchange for a first amount of consideration and a second offer to remove or reduce the second period in exchange for a second amount of consideration, wherein the particular amount of consideration is less than the sum of the first and second amounts of consideration.

3. The system of claim 2, wherein the first period required for the first completion of the first game action is currently pending within the online game, and wherein the second period required for the second completion of the second game action is currently pending within the online game.

4. The system of claim 1, wherein the first completion of the first game action reflects progress by the first user within the online game.

5. The system of claim 2, wherein the one or more physical processors are further configured by machine-readable instructions to effectuate presentation of the first offer, the second offer, and the particular offer at the same time.

6. The system of claim 2, wherein the one or more physical processors are further configured by machine-readable instructions such that a determination of the particular amount of the consideration includes a determination of a discount with respect to the first amount of consideration and/or the second amount of consideration.

7. The system of claim 2, wherein the one or more physical processors are further configured by machine-readable instructions to select the first period and the second period for inclusion in the particular offer from a set of periods that includes at least one other period.

8. The system of claim 7, wherein the one or more physical processors are further configured by machine-readable instructions to predict likelihoods of users spending consideration to remove or reduce periods required for completion of individual game actions, such that a first likelihood indicating that the first user will likely spend the first amount of consideration to remove the first period, and a second likelihood indicating that the first user will likely not spend the second amount of consideration to remove the second period are predicted; and
wherein the selection of the first pending period and the second period for inclusion in the particular offer is based on the first and/or second likelihoods.

9. The system of claim 8, wherein the one or more physical processors are further configured by machine-readable instructions such that generation of the particular offer includes a determination of the particular amount of consideration.

10. A computer-implemented method for facilitating completion of game actions by users within an online game without having to wait for periods of time for the completion of the game actions, the method being implemented on a system that includes one or more physical processors and storage media storing machine-readable instructions, the method comprising:
executing an instance of a game space in which the online game is played, and enabling interaction of the users with the game space and/or each other, wherein playing the online game includes executing game actions on behalf of the users, wherein the game actions include game actions that require particular periods of time for corresponding completion, wherein the particular periods of time are removable and/or reducible such that the users no longer have to wait for the particular periods of time, wherein the game actions include a first game action that requires a first period for a first completion and a second game action that requires a second period for a second completion;
generating offers to remove or reduce the particular periods of the game actions in exchange for consideration from the users, wherein the offers include, for a first user, a particular offer to remove both of the first period and the second period in exchange for a particular amount of consideration; and
presenting the particular offer to the first user through one or more user interfaces on a first client computing platform, wherein the first client computing platform is associated with the first user.

11. The method of claim 10, wherein the offers further include a first offer to remove or reduce the first period in exchange for a first amount of consideration and a second offer to remove or reduce the second period in exchange for a second amount of consideration, wherein the particular amount of consideration is less than the sum of the first and second amounts of consideration.

12. The method of claim 11, wherein the first period required for the first completion of the first game action is currently pending within the online game, and wherein the second period required for the second completion of the second game action is currently pending within the online game.

13. The method of claim 10, wherein the first completion of the first game action reflects progress by the first user within the online game.

14. The method of claim 11, further comprising:
effectuating presentation of the first offer, the second offer, and the particular offer at the same time.

15. The method of claim 11, wherein a determination of the particular amount of the consideration includes a determination of a discount with respect to the first amount of consideration and/or the second amount of consideration.

16. The method of claim 11, further comprising:
selecting the first period and the second period for inclusion in the particular offer from a set of periods that includes at least one other period.

17. The method of claim 16, further comprising:
predicting likelihoods of users spending consideration to remove or reduce periods required for completion of individual game actions such that predicting a first likelihood indicating that the first user will likely spend the first amount of consideration to remove the first period, and a second likelihood indicating that the first user will likely not spend the second amount of consideration to remove the second period, and wherein the selection of the first period and the second period for inclusion in the particular offer is based on the first and/or second likelihoods.

18. The method of claim 17, wherein generating the particular offer includes determining the particular amount of consideration.

19. The method of claim 11, further comprising:
facilitating presentation of game space interfaces implemented on client computing platforms associated with the users, the game space interfaces including a first game space interface implemented on the first client computing platform associated with the first user, the first game space interface including simultaneous or near-simultaneous presentation of the first, the second, and the particular offers, and enabling the first user to accept one or more of the first, the second, and/or the particular offer.

* * * * *